United States Patent
Thompson et al.

(10) Patent No.: US 7,523,666 B2
(45) Date of Patent: Apr. 28, 2009

(54) LEAK LOCATOR

(75) Inventors: Martin Thompson, Cambridge (GB);
Martin Francis Lucien Harper, Cambridge (GB)

(73) Assignee: Advnaced Engineering Solutions Ltd. (GB)

( * ) Notice: Subject to any disclaimer, the term of this patent is extended or adjusted under 35 U.S.C. 154(b) by 0 days.

(21) Appl. No.: 10/540,590

(22) PCT Filed: Dec. 24, 2003

(86) PCT No.: PCT/GB03/05721

§ 371 (c)(1),
(2), (4) Date: Nov. 16, 2005

(87) PCT Pub. No.: WO2004/059274

PCT Pub. Date: Jul. 15, 2004

(65) Prior Publication Data

US 2006/0101915 A1    May 18, 2006

(30) Foreign Application Priority Data

Dec. 27, 2002    (GB) ............................. 0230207.3

(51) Int. Cl.
*G01H 3/00* (2006.01)
*G01R 33/20* (2006.01)
(52) U.S. Cl. .......................... 73/592; 73/632
(58) Field of Classification Search .................. 73/592, 73/618, 623, 639, 640, 40, 40.5 A, 638, 40.5 R, 73/619, 622, 632, 633
See application file for complete search history.

(56) References Cited

U.S. PATENT DOCUMENTS

| 2,884,624 | A |   | 4/1959  | En Dean et al. ............. 340/282 |
| 3,409,897 | A |   | 11/1968 | Bosselaar et al. ............. 346/33 |
| 3,413,653 | A | * | 11/1968 | Wood ........................ 346/33 S |
| 3,508,433 | A |   | 4/1970  | Bustin ........................ 73/40.5 |
| 3,517,546 | A | * | 6/1970  | Fraser ...................... 73/40.5 R |
| 3,691,819 | A | * | 9/1972  | Guest ...................... 73/40.5 A |
| 3,722,261 | A | * | 3/1973  | Milke ...................... 73/40.5 R |
| 3,754,275 | A |   | 8/1973  | Carter et al. .................... 346/1 |
| 4,253,167 | A | * | 2/1981  | Flournoy et al. ............ 367/118 |
| 4,485,668 | A | * | 12/1984 | Hudson et al. ........... 73/40.5 A |
| 4,799,391 | A | * | 1/1989  | Lara .......................... 73/865.8 |
| 5,084,764 | A | * | 1/1992  | Day .......................... 348/84 |
| 6,474,165 | B1| * | 11/2002 | Harper et al. .................. 73/623 |
| 6,931,952 | B2| * | 8/2005  | Rantala et al. ............. 73/866.5 |
| 2004/0025607 | A1| * | 2/2004 | Rantala et al. ............. 73/866.5 |

FOREIGN PATENT DOCUMENTS

JP    58042946 A  *  3/1983
JP    62025229 A  *  2/1987

* cited by examiner

*Primary Examiner*—Hezron Williams
*Assistant Examiner*—Tamiko D Bellamy
(74) *Attorney, Agent, or Firm*—Nields, Lemack & Frame, LLC

(57) ABSTRACT

A method of determining the presence and location of leaks in a pipeline (2) comprising inserting a leak location device capable of detecting and recording the occurrence of noise into the flow of fluid (1) within the pipeline (2); allowing the leak location device to travel through the pipeline (2) with the fluid flow; causing the leak location device to detect and record noise in the fluid; and causing the leak location device to record the time at which noise is detected. Generally the leak location device is retrieved from the pipeline (2) downstream to its insertion point.

26 Claims, 5 Drawing Sheets

LEAK LOCATOR

FIELD OF THE INVENTION

The present invention relates to a leak detection/location system for use in pipelines.

BACKGROUND OF THE INVENTION

In petroleum oil, in water and in gas pipelines there are from time to time leaks of the transported fluid through punctures or cracks in the pipe wall. Such leaks can be of economic and environmental importance and need to be located as quickly as possible. The more accurately they can be located the less disruption there is to the environment and to above ground infrastructure such as roads. There are means available to detect leaks of this nature but none of them is entirely successful in pipelines exceeding 300 mm in diameter or in plastic pipes exceeding 400 m in length between access points.

A sudden rupture can generate pressure transients that can be detected at each end of the pipe. The timing of these transients can be interpreted to give the location of the leak. However such transient detection means can be thwarted by attenuation in the pressure pulse over distances exceeding 400 m. Also smearing of the original signal by dispersion in pipes greater than 300 mm in diameter can invalidate interpretation. Dispersion is a physical phenomenon whereby the speed of sound is frequency dependent. As a result the characteristic shape of time varying signals are distorted with increasing distance. Dispersion can be a significant problem in some pipelines over distances over distances exceeding 400 m and would deny the benefit of the interpretation of pressure transients. Pressure transients can also arise from other sources than leaks and it is difficult to avoid false alarms. For these reasons, pressure transient detection is only used in limited application such as process plant.

A leak of fluid from a pipe that is under pressure generates broad-band noise that travels both upstream and downstream along the pipe and the contained fluid. If the noise is detected both upstream and downstream by means of a vibration transducer attached to the pipe then cross-correlation of these signals can often give an indication of the location of the leak. This means is a first stage in detection indicating there is a leak and giving some indication of the area in which it might be found. However this means is thwarted by attenuation particularly in plastic pipes exceeding typically 400 m in length and by dispersion in pipes typically 300 mm in diameter. A number of systems utilising vibration transducers in such a method are available from Palmer Environmental Ltd, Gutermann and Primayer Ltd for example.

The acoustic noise from a fluid leak is often transmitted through the surrounding material to the ground surface. The surface noise level is extremely low but there are means of detecting that noise and locating the leak. However the use of surface noise to give a final accurate location of a leak is a second stage location method. In the first stage one needs to know there is a leak to look for and to know roughly the area in which to look, otherwise a search can take a long time. Second stage devices that detect at a single point on the ground surface are known as ground microphones and are available from the companies mentioned previously. A second stage device that detects along a line rather than at one point is the Magic Carpet manufactured by Stest Ltd.

A first and second stage device for water pipes is available from P11 Waterline Ltd sold under the Registered Trade Mark of the 'Sahara Leak Detection System'. This device consists of a hydrophone tethered to an umbilical cable that connects the hydrophone through the pipe back to the surface through a gland at the insertion point. The device is inserted into a pipeline and drawn along by the water. It drags the umbilical along behind it and listens for acoustic noise from leaks. The noise data is relayed back to the surface via the umbilical cable. The umbilical limits the distance over which this device can be deployed, typically up to half a kilometer. The use of an umbilical may disturb deposits on the pipe wall and so discolour the water-something that Water Companies prefer to avoid.

When distances are greater than a few hundred meters and the pipe diameter is greater than of the order of 300 mm it is more effective to detect leaks from the inside of the pipe. Such systems are first and second stage detection devices, determining that there is a leak and locating that leak. The Sahara System is limited in range of operation by the use of an umbilical.

SUMMARY OF THE INVENTION

According to a first aspect of the present invention there is provided a leak location device comprising a housing capable of travelling in a pipeline, the housing accommodating a hydrophone, a timer and a memory, wherein the hydrophone and the timer are capable of generating an output and the memory is capable of recording the hydrophone output with reference to the timer output.

This has the advantage that all of the elements required to detect and locate a leak are contained within one device, which therefore need not be linked to a monitoring device.

The housing may have a resilient outer surface. This is advantageous as, in use, the device will strike the walls of a pipeline while travelling therethrough; a resilient housing will protect the hydrophone, timer and memory housed therein.

Preferably, the housing is shaped and sized such that the device may be introduced into and retrieved from a pipeline through standard fittings. This is advantageous as the device can therefore be used with existing pipelines and equipment.

In one embodiment, the housing is spherical. In an alternative embodiment, the housing is an oval shape. In such embodiments, the device may be arranged such that the centre of buoyancy and centre of gravity lie on its long axis but are separated so that the device will tend to maintain its long axis vertical. This is advantageous as it will cause the lighter end to protrude from any recesses in the pipe upper surface, such as air valves or hydrants, into which it may float, so that the drag of passing fluid will tend to pull it out of the recess and thus avoid its becoming trapped.

Advantageously, the device is arranged to record hydrophone output and the timer output as the device passes through the pipeline.

Preferably, the device has substantially neutral buoyancy in the fluid passing through the pipeline.

The device may be arranged such that in use it may determine that there is a leak and locate the position of that leak.

Preferably the housing accommodates a electromagnetic transmitter, which may be a low frequency continuous detector-occasional transmitter (CDOT). This is advantageous in that it can be used to provide information concerning the position and velocity of the device.

The CDOT may be arranged to detect low frequency electromagnetic signals and record in the memory the time at which these were received. This is advantageous as the device can be used to detect low frequency electromagnetic signals produced by transmitters, which may be continuous transmitter-continuous detectors (CTCD) placed at the launch and retrieve ends and at intermediate points on a pipeline into which the device may be introduced.

The CDOT may be arranged such that when a signal is received, the CDOT transmits a signal.

This is advantageous as such a signal could be detected by a surface CTCD. The recording in the memory of the times at which signals from the surface CTCDs are detected and knowledge of their locations should allow the times at which the device detects leaks to be correlated with distance travelled along the pipe. The detection at the surface of the reply transmitted by the on-board CDOT gives an indication of the progress of the device through the pipe.

Preferably, when a time passes since last detecting a signal that substantially exceeds a predetermined expected time, the CDOT will begin to transmit an alarm signal every few seconds. This is advantageous as such a time delay may indicate that the device has become stuck in a pipeline. The alarm may be used to locate the device, for example using a hand held surface low frequency electromagnetic detector.

According to a second aspect of the present invention, there is provided a method of determining the presence and location of leaks in a pipeline comprising:
 i) inserting a leak location device capable of detecting and recording the instance of noise into the flow of fluid within the pipeline;
 ii) allowing the leak location device to travel through the pipeline with the fluid flow;
 iii) causing the leak location device to detect and record noise in the fluid; and
 iv) causing the leak location device to record the time at which noise is detected.

This is advantageous in that all the detection equipment required is housed within the leak detection device. The leak detection device may be inserted into a pipeline and travel an unlimited distance before it is retrieved and the recorded instances of noise can provide an indication of the presence of a leak and further the time at which the instance was noted can be used to determine the position of the leak with reference to the rate of fluid flow.

Generally the device will be retrieved from the pipeline downstream.

The method may include the further step of downloading the recorded instances of noise along with the time at which they were detected onto a computing device.

The method may comprise recording the time at which the leak detection device is inserted into the pipeline and/or the time at which it is retrieved therefrom. This could be used to determining the distance which the leak detection device had travelled before an instance of noise was detected and therefore be used to determine the position of the leak causing the noise.

Alternatively, or additionally, the method may further comprise tracking the position of the leak detection device as it travels through the pipeline. This may enable a more accurate estimate of the position of the leak to be determined.

Tracking may be achieved by causing the leak detection device to emit a signal periodically, continuously, on receipt of a signal or at any other time.

Preferably, the method comprises inserting the device into the pipeline and/or retrieving the device from the pipeline using a standard fitting.

In one embodiment, the method comprises providing the leak detection device with an electromagnetic (EM) detector and or emitter. The detector/emitter may be a continuous detector—occasional transmitter (CDOT), which may be a low frequency CDOT.

The method may further comprise placing electromagnetic emitter/detectors at points along the pipe and causing the emitter/detector to emit a signal. The or each emitter/detector may comprise low-frequency EM continuous transmitter—continuous detectors (CTCD) at the start, at the end and at other along the pipe, and causing the or each CTCD to transmit signals, which transmitted signals can be detected by the leak detection device inside a pipeline.

As the skilled person will appreciate, it is advantageous to transmit a signal that it can be detected even when the pipe is metallic.

The method may further comprise causing the leak detection device to pass beneath such a surface CTCD, the leak detection device detecting an EM signal from the CTCD and recording the time at which this occurs.

The method may further comprise, having detected the signal transmitted from the surface, causing the CDOT to emit a signal that is detected by the surface CDCT which then displays the fact that the leak location device has reached that point.

The method may comprise causing the leak location device to collect acoustical data which may be used to indicate the presence of a leak. The method may further comprise downloading the data into a computer, comparing the data to predetermined data indicative of a leak, detecting any match with the predetermined data and displaying the presence of any leaks and their location along the pipeline that has been traversed.

As will be apparent to the skilled person, positioning information on leaks may be deduced from a translation of the time information recorded in the leak location device into distance location information by interpolation from the time at which the EM transmission signals that are transmitted by CTCDs at known locations were received. If the EM signals are not available then the time of entry into the pipe and the time of retrieval would be used to provide distance information, although at reduced accuracy.

The device can travel unlimited distance inside a pipe without significantly disturbing any deposits on the pipe wall. In a preferred embodiment, the leak location device is a small device, similar in size to a tennis ball and possibly smaller, that travels along with the fluid flow and is completely autonomous. The device may have soft spongy outer walls to minimize material dislodged from the walls on impact. It preferable is close to neutral buoyancy. After insertion into the flow through a standard fitting it is swept along by the fluid flow listening for leaks generally until it is eventually caught and withdrawn from the pipe. The information is recorded during its travels and when downloaded into a computer it displays the presence of any leaks and gives their location.

The device may be referred to as the Leakage Location Pill, or just the Pill. The Leakage Location Pill is preferably autonomous, having no umbilical cable. Being close to neutrally buoyant is advantageous because it allows the Pill to travel with the flow of fluid. The Pill preferably has soft, squashable outer walls that ensure that any impact with the pipe wall is gentle so that little if any material is knocked off the internal wall of the pipe and that such impact generates little acoustic noise. In the preferred embodiment the order of softness is similar to that provided by ten millimeters or more of soft open cell foam. The Pill contains a hydrophone to listen for leak noise. The data generated by the hydrophone is preferably stored on-board in electronic memory.

According to a third aspect of the present invention, there is provided a leak location system comprising a leak detection device arranged to collect acoustical data and at least one monitoring means wherein the or each monitoring means is capable of transmitting signals and the leak detection device is capable of receiving the transmitted signals.

The monitoring means provides a means to monitor the position of the leak detection device as it travels along the pipeline.

Preferably, the leak detection device is capable of transmitting signals and the monitoring means is capable of receiving signals.

The leak detection means may comprise any of the features described in relation to the first aspect of the invention.

The system may further comprise a computing means arranged to process data collected by the leak detection device.

The leak detection device and the computing means may be arranged such that the data may be downloaded from the leak detection device onto the computing means.

The proposed method is non-intrusive and does not require any pigging or cleaning operations.

In this proposed method low frequency EM transmitters may be deployed at the entry and exit to the pipe and at some convenient intermediate positions along the run that may extend over several kilometers. The more intermediate positions there are the more accurate will be the estimate of position of the leaks. Typical intermediate positions might be at 500 m intervals. Advanced Engineering Solutions Ltd manufacture suitable transmitters and receivers. To launch a Pill a launch cylinder containing the Leak Location Pill may be placed over a valve on a fitting. The diameter of the fitting pipe is generally smaller than the diameter of the main pipeline and the valve opens to the full bore of that fitting pipe. In one embodiment the valve is initially closed, the valve is then opened and a push rod used to drive the Pill through the valve into the flow in the main pipe. The Pill travels along the pipe recording sound levels as it goes. A suitable hydrophone to record the noise is manufactured by Bruel and Kjaer. A dedicated signal processor such as is commonly used in the audio industry may be suitable to process the acoustic data and record it in digital form. The memory requirements may only a few megabytes and a flash memory card or other preferably non-volatile form of memory may be used to store the digital data. The Pill should successfully negotiate bends, take-offs as long as they are not flowing, and air release valves. In preferred embodiments and as it passes the EM transmitters the received EM signal is recorded inside the Pill. Preferably, at the retrieval location a catch device is deployed through a full bore valve on a fitting. As the Pill reaches the retrieval point it may be caught and withdrawn through the full bore fitting valve. The valve may then be closed and the retrieval tube may be removed, together with the Pill. The data download computer is plugged into the Pill and the data is retrieved. The acoustic data and the EM-transmitted data are processed to show the location of leaks along the length of the pipe. When a graphical information system (GIS) is available it can be helpful to display on the GIS system the location of leaks along the pipeline.

The EM unit inside the Pill may include both a receiver and a transmitter. In the event that the Pill should become stuck then, after a fixed period of elapsed time that significantly exceeds the total expected travel time, the EM device may be arranged to begin to transmit 'alarm' information such as a simple pulse or single frequency at regular intervals. A hand held detector above the surface may be used to detect the transmitted information and pin point where the Pill is stuck. In some embodiments, if the Pill should free itself then the next time it detects a surface transmitter the alarm will turn off.

According to a fourth aspect of the invention there is provided a leak location device comprising a housing shaped and sized such that the device may be introduced into and retrieved from a pipeline through existing fittings and travel with the flow of fluid through the pipeline, the housing accommodating a hydrophone coupled to a memory for recording the hydrophone output signal together with the time at which the signal is recorded as the device passes through the pipeline, the housing having a resilient outer surface and the device having substantially neutral buoyancy in the fluid passing through the pipeline.

Such a device enables both a leak and its position to be determined.

A specific embodiment of the invention is now described by way of example with reference to the accompanying FIGS. 1 to 5 that are explanatory sketches of the apparatus in operation.

Figure 1:
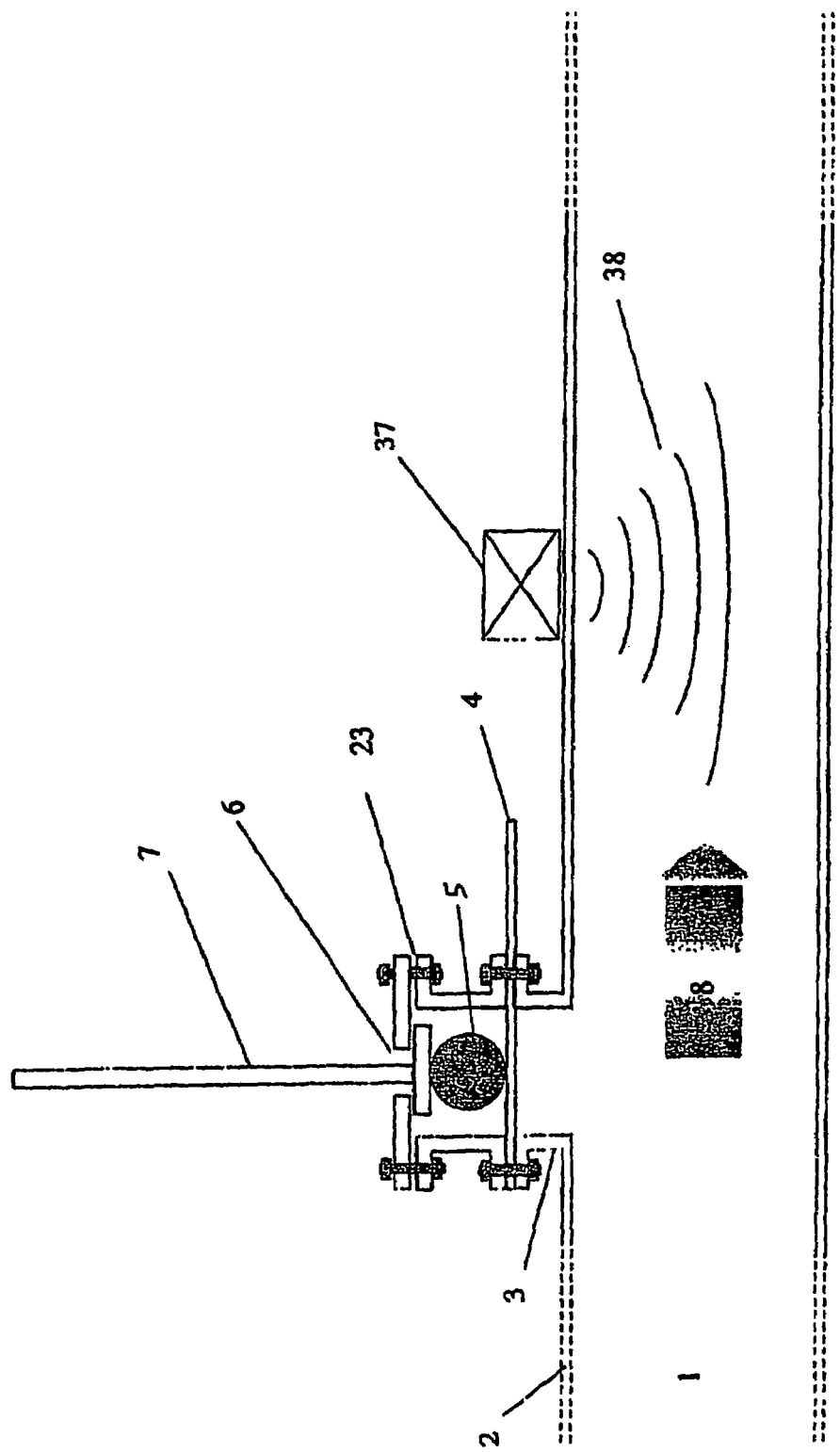
FIG. 1 shows the means of introducing the Leak Location Pill into the pipeline.

In the embodiment shown in FIG. 1 the pipeline 2 carries the fluid 1 with the direction of flow 8 indicated. A off-take 3 is shown, fitted with a full-bore valve 4—shown in the closed position. With the valve 4 closed, a spool piece 23 is fitted containing the leak location device, herein after referred as Pill 5. The spool piece 23 has a push rod 7 passing through a pressure gland 6. Close-by downstream of the off-take 3 is a low frequency EM transmitter 37. The Pill 5 is turned on before being placed in the spool piece 23. The valve 4 is opened fully and the push rod 7 is used to insert the Pill 5 into the main flow of the fluid 1 in the pipe 2. The fluid flow 8 will transport the Pill 5 downstream and as it detects the electromagnetic field 38 emitted from the low frequency EM transmitter 37 the Pill 5 will record the time at which this signal 38 is detected.

Figure 2:
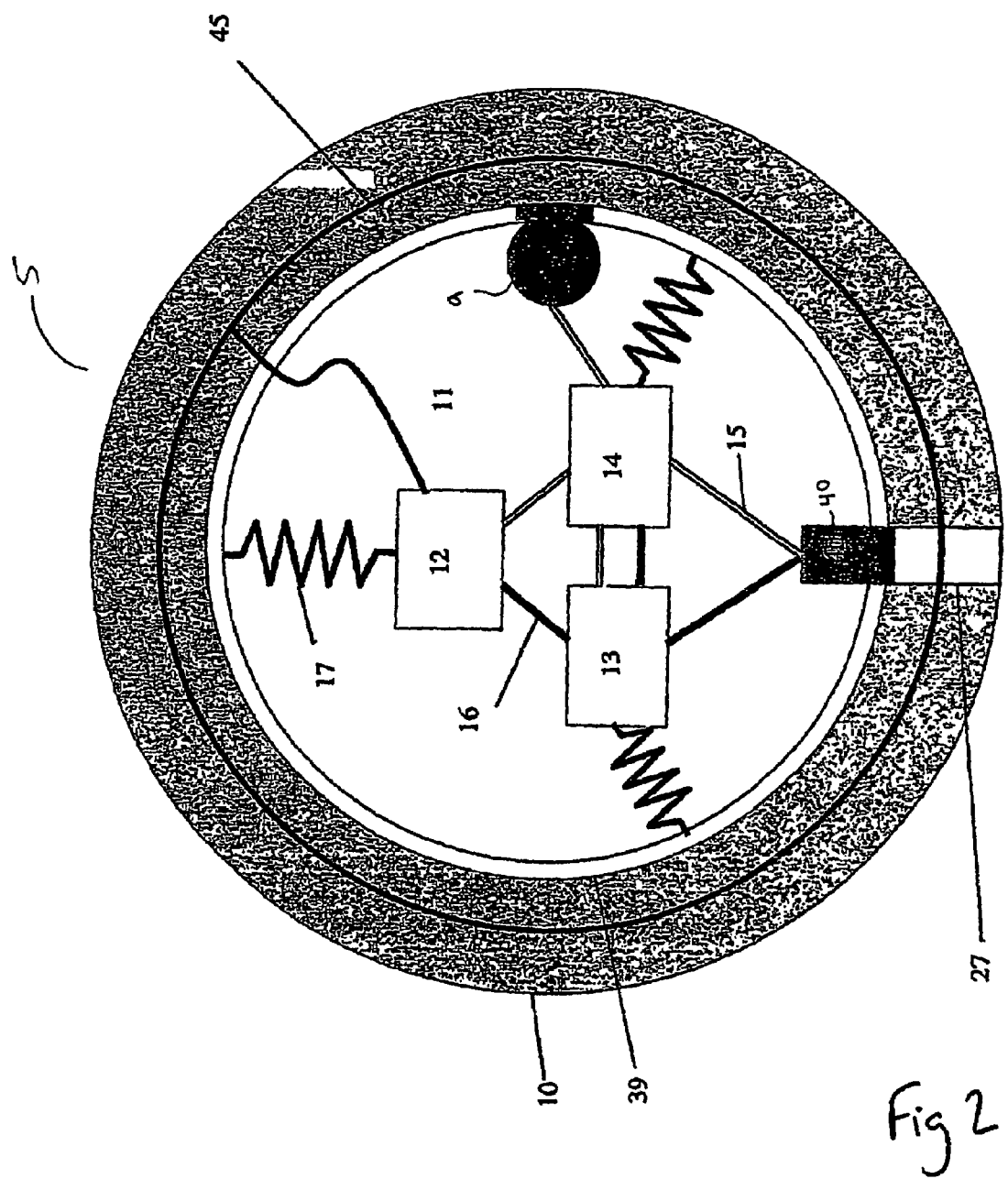
FIG. 2 shows detail of the Leak Location Pill in one cross-section.

In FIG. 2 is shown in schematic form the detail of the interior of the Pill 5. A layer 10 of soft material such as open cell foam surrounds the outer coating 39 of the internal electronics. The foam 10 forms a barrier to ensure that any wall contact is gentle yet does not impede the passage of acoustic waves from the leak generated noise. Inside the Pill 5 is an acoustic hydrophone 9 whose sensitive face penetrates the outer wall 39. Internally there is a module 14 containing signal conditioning, amplifier, analogue to digital converter, robust memory and a digital signal processor. There is also a low frequency EM unit 12 containing a receiver/transmitter and with antenna 45 and power supply 13. The units are interconnected by power cables 16 and data cables 15. The hard shell 39 is penetrated by a high pressure connector 40 that incorporates a power switch operated by external intervention through a hole 27 in the outer material. All the internal units 12, 13, 14 are supported by anti-shock mounts 17. The connector 40 is used to download stored data at the end of a survey and also to provide means to recharge the batteries 13 without needing to open up the Pill 5.

Figure 4:
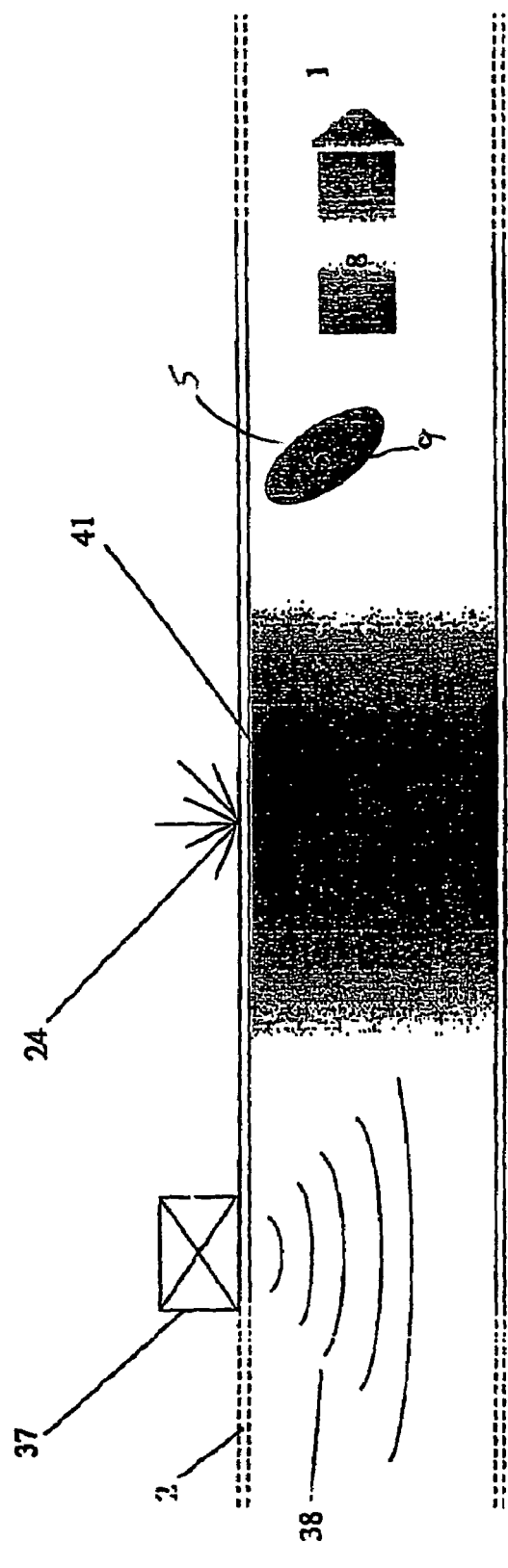
FIG. 4 shows the Leak Location Pill travelling along the pipe.

Leaks from high pressure pipes generate noise in the transported fluid. In FIG. 4 is shown the Pill 5 in the pipe 2 being pushed along by the fluid 1 in the direction of flow 8. A leak 24 in the wall of the pipe 2 causes acoustic noise 41 to travel upstream and downstream. The noise 41 is detected by the hydrophone 9 on the pill 5 and the magnitude and time are recorded in its internal memory. To improve the accuracy of translation of timing information into positional information along the pipe there can be low frequency EM transmitters 37 placed at fixed points along the pipe as well as at the end points. The location of these fixed points is recorded on a surface computer system. As the Pill 5 passes these fixed points it detects the low frequency waves 38 and records the time at which these are detected. Having detected the presence of the surface transmitter, the Pill 5 transmits a brief response that in its turn is detected by the surface receiver 37 and an indication given that the Pill 5 has reached this point.

Figure 5:
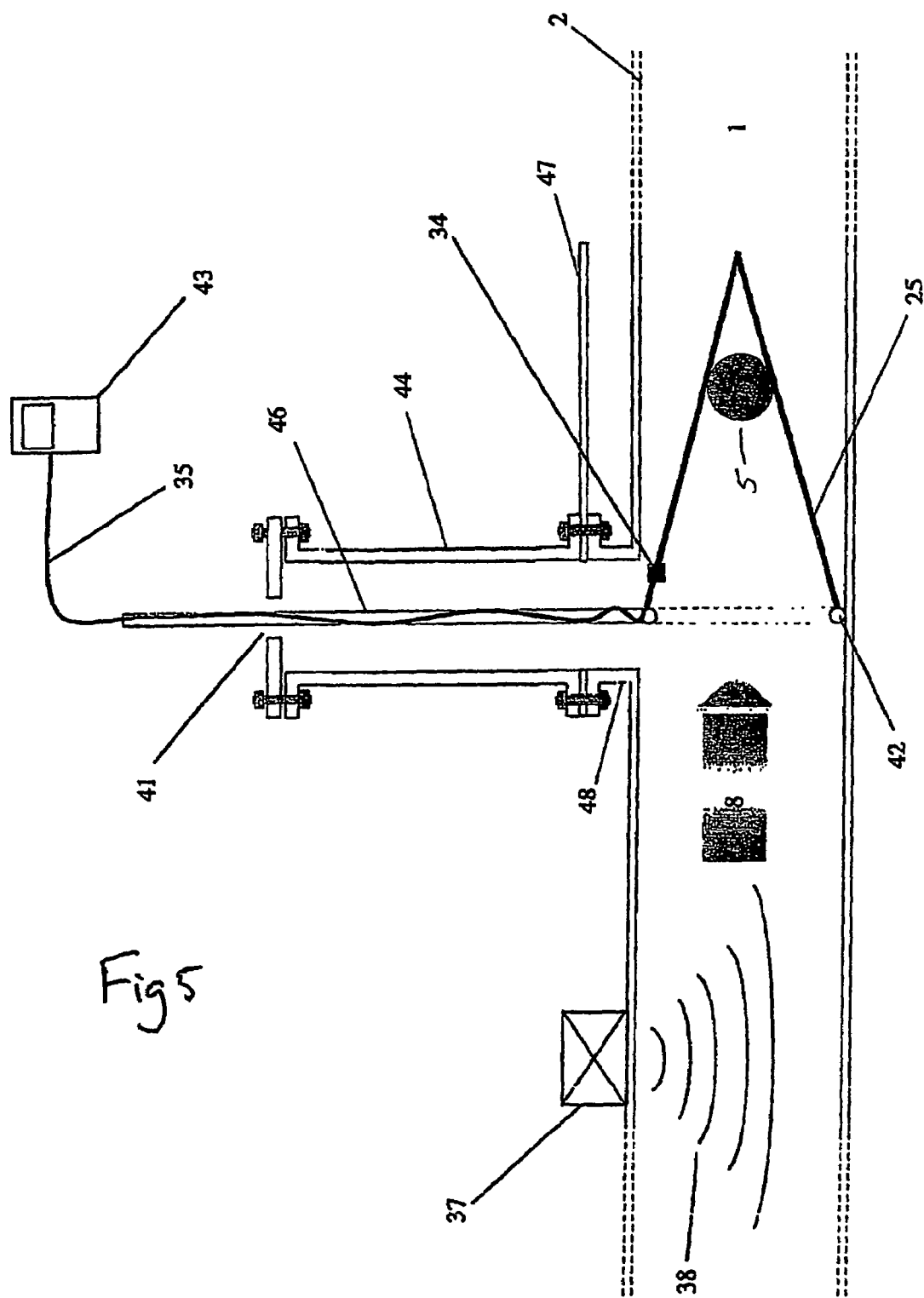
FIG. 5 shows the means of retrieving the Leak Location Pill from the pipeline.

In FIG. 5 is shown in schematic form how the Pill 5 is retrieved from the pipe 2 at the end of its run. An off-take 48 has on top a full-bore valve 47. Sitting on the valve 47 is a spool piece 44 through which passes an operating rod 46 through a pressure sealing gland 41. The operating rod 46 has at the fluid end a spring steel loop or other deformable frame piece 42 that forms the mouth of a catching net 25. A device 34 for detecting the extra drag on the net when the Pill 5 is in it is mounted on the rod 46. The device 34 is preferably a strain gauge that can give a simple indication at surface when the Pill 5 is trapped by the net. The cable 35 from the gauge 34 can travel up the centre of the operating rod 46 to avoid compromising the sealing gland 41. In operation as the Pill approaches the retrieval station it detects the low frequency EM waves 38 emitted by the transmitter 37 just upstream of the retrieval station. The time of this occurrence is recorded in the Pill memory. As the Pill passes the retrieval station the net 25 catches it and a signal generated by the gauge 34 is relayed to the surface. A simple meter 43 indicates that the Pill has been caught and the operating rod is withdrawn collapsing the expandable mechanism and pulling the Pill into the space between the valve 47 and the sealing gland 41. The valve 47 is then closed and the spool piece removed to enable the Pill to be completely removed from the water.

After retrieval, the leak noise signal information, the information on the signals received from the low frequency EM transmitters along the way, and the accompanying information on the times at which the signals were received are available to be downloaded via the connector 40. From this information may be estimated firstly the times at which the Pill 5 passed leaks in the pipe work and secondly the location of these leaks.

Figure 3:
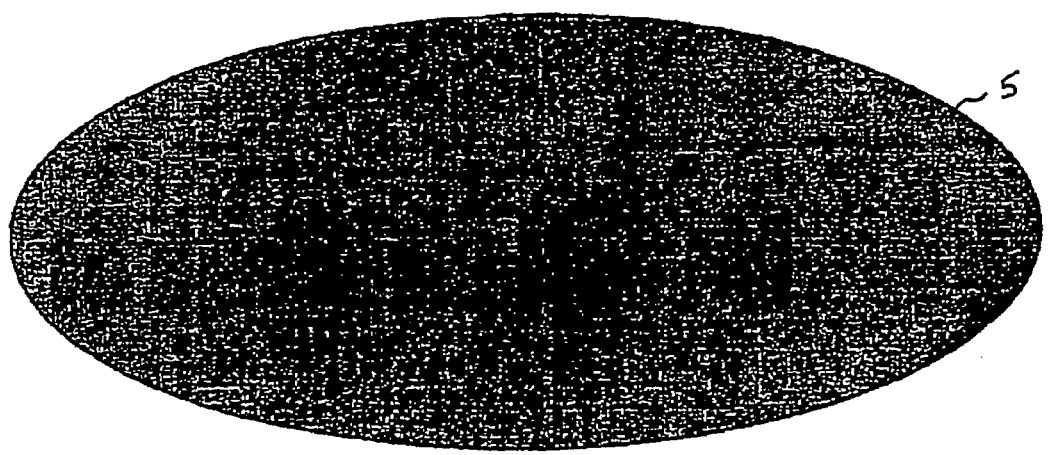
FIG. 3 shows an alternative external profile of the Leak Location Pill.

In a second preferred embodiment of the invention, shown in FIG. 3, the Pill is not spherical but elongated. Its centre of buoyancy and centre of gravity lie on its long axis but are separated so that the Pill will tend to maintain its long axis vertical. This will cause its lower end to protrude from any recesses in the pipe upper surface, such as air valves or hydrants, into which it may float, so that the drag of passing fluid will tend to pull it out of the recess and thus avoid its becoming trapped. However, if the Pill 5 should become trapped then, after a period of time that exceeds the expected transit time from launch to retrieve, the Pill 5 will begin to emit an EM alarm at regular intervals. The alarm will be detected by a portable EM detector so that the trapped Pill 5 can be found. If the Pill 5 should subsequently free itself then the alarm will turn off on the next occasion that a surface transmitter is detected. The fact that the alarm has been triggered will be recorded in the internal memory so that the timing information from this run can be rejected.

The invention claimed is:

1. A self-contained leak location device comprising a housing capable of travelling in a pipeline, the housing accommodating a hydrophone, a timer and a memory, wherein the hydrophone and the timer are capable of generating an output and the memory is capable of recording the hydrophone output with reference to the timer output, said device shaped and sized to travel in the flow of fluid through the pipeline and including a transmitter/receiver to allow the transmission and reception of signals to and from at least one location externally of the pipeline which allows the location of the device with respect to the pipeline to be determined, and wherein said device has substantially neutral buoyancy in the fluid passing through the pipeline so as to be positioned within the fluid out of contact with the pipeline and be swept along the pipeline by the fluid downstream to a retrieval point.

2. A leak location device according to claim 1 in which the housing comprises a resilient outer surface.

3. A leak location device according to claim 1 or claim 2 in which the housing is shaped and sized such that the device may be introduced into and retrieved from a pipeline through standard fittings.

4. A leak location device according to claim 1 in which the housing is spherical.

5. A leak location device according to claim 1 in which the housing is an oval shape.

6. A leak location device according to claim 5 in which the device is arranged such that the centre of buoyancy and centre of gravity lie on its long axis.

7. A leak location device according to claim 1 which is arranged to record the hydrophone output and the timer output as the device passes through the pipeline.

8. A leak location device according to claim 1 which is arranged such that in use it is be used to determine that there is a leak and locate the position of that leak.

9. A leak location device according to claim 2 which comprises an electromagnetic transmitter.

10. A leak location device according to claim 9 in which the electromagnetic transmitter is a low frequency continuous detector-occasional transmitter (CDOT).

11. A leak location device according to claim 10 in which the CDOT is arranged to detect low frequency electromagnetic signals and provide an output to the memory of the time at which these were received.

12. A leak location device according to claim 11 in which the CDOT is arranged such that when a signal is received, the CDOT transmits a signal.

13. A leak location device according to claim 12 in which when a time passes since last detecting a signal that substantially exceeds a predetermined expected time, the CDOT periodically transmits an alarm signal.

14. A method of determining the presence and location of leaks in a pipeline comprising:
   i) inserting a self-contained leak location device capable of detecting and recording the occurrence of noise into the flow of fluid within the pipeline;
   ii) allowing the leak location device to travel through the pipeline with the fluid flow;
   iii) causing the leak location device to detect and record noise in the fluid and pipeline; and
   iv) causing the leak location device to record the time at which noise is detected and wherein the device is provided to have substantially neutral buoyancy in the fluid passing along the pipeline so as to lie within the fluid out of contact with the pipeline and be swept along the pipeline by the fluid downstream to a retrieval point.

15. A method according to claim 14 in which the method further comprises retrieving the leak location device from the pipeline downstream to its insertion point.

16. A method according to claim 14 or 15 which includes the further step of downloading the recorded instances of noise along with the time at which they were detected onto a computing device.

17. A method according to claim 14 which further comprises recording the time at which the leak detection device is inserted into the pipeline and/or the time at which it is retrieved therefrom.

18. A method according to claim 14 which further comprises tracking the position of the leak detection device as it travels through the pipeline.

19. A method according to claim 18 in which tracking is achieved by causing the leak detection device to emit a signal periodically and/or continuously, on receipt of a signal.

20. A method according to claim 14 which further comprises inserting the device into the pipeline and/or retrieving the device from the pipeline using a standard fitting.

21. A method according to claim 14 which further comprises placing surface electromagnetic transmitters and/or receivers at points along the pipe and causing the transmitter/receiver to emit a signal.

22. A method according to claim 21 which comprises causing the leak detection device to pass beneath a surface transmitter, the leak detection device detecting a signal from the surface transmitter and recording the time at which this occurs.

23. A method according to claim 21 wherein once the device further detects the signal transmitted from the surface, the device is caused to emit a signal that is detected by the surface transmitter/receiver, causing the transmitter/receiver to display the fact that the leak location device has reached that point.

24. A method according to claim 14 which further comprises causing the leak location device to collect acoustical data, comparing the data to predetermined data indicative of a leak and detecting any match with the predetermined data to determine the presence of any leaks and their location along the pipeline that has been traversed.

25. A leak location system according to claim 1 wherein the leak location device is used in conjunction with computing means arranged to process data collected by said device.

26. A leak location device system according to claim 25 in which the leak detection device and the computing means are arranged such that the data may be downloaded from the leak detection device onto the computing means.

* * * * *